United States Patent
Yang et al.

(10) Patent No.: US 10,342,000 B2
(45) Date of Patent: Jul. 2, 2019

(54) CONTROL INFORMATION SENDING METHOD AND APPARATUS

(71) Applicant: HUAWEI TECHNOLOGIES CO., LTD., Shenzhen, Guangdong (CN)

(72) Inventors: Xun Yang, Beijing (CN); Rui Ni, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 133 days.

(21) Appl. No.: 15/441,361

(22) Filed: Feb. 24, 2017

(65) Prior Publication Data
US 2017/0164342 A1 Jun. 8, 2017

Related U.S. Application Data

(63) Continuation of application No. PCT/CN2014/085179, filed on Aug. 26, 2014.

(51) Int. Cl.
*H04W 72/04* (2009.01)
*H04W 4/02* (2018.01)
(Continued)

(52) U.S. Cl.
CPC ........ *H04W 72/042* (2013.01); *H04W 4/02* (2013.01); *H04W 48/18* (2013.01); *H04W 24/02* (2013.01); *H04W 84/12* (2013.01)

(58) Field of Classification Search
None
See application file for complete search history.

(56) References Cited

U.S. PATENT DOCUMENTS

| 6,907,245 B2 * | 6/2005 | Ohlsson ............... H04W 36/18 370/331 |
| 7,317,876 B1 | 1/2008 | Elliott |

(Continued)

FOREIGN PATENT DOCUMENTS

| CN | 1922803 A | 2/2007 |
| CN | 102340843 A | 2/2012 |
| CN | 102812753 A | 12/2012 |

OTHER PUBLICATIONS

International Search Report dated May 28, 2015 in corresponding International Patent Application No. PCT/CN2014/085179.
(Continued)

*Primary Examiner* — Jamaal R Henson
(74) *Attorney, Agent, or Firm* — Staas & Halsey LLP

(57) ABSTRACT

Embodiments of this application provide a control information sending method and apparatus, where the method includes: obtaining a control information indication message from a first standard network, selecting a second standard network from one or more other networks that constitute a heterogeneous network with the first standard network, and sending the control information indication message to the second standard network, and then to a client over the second standard network. The control information indication message is used to instruct to substitutively send control information of the first standard network. According to the method and apparatus provided, the control information of the first standard network is substitutively sent over the second standard network, and sending the control information does not need to occupy bandwidth of the first standard network. Therefore, in comparison with the prior art, a network capacity of service data sent over the first standard network can be increased.

12 Claims, 3 Drawing Sheets

(51) Int. Cl.
*H04W 48/18* (2009.01)
*H04W 84/12* (2009.01)
*H04W 24/02* (2009.01)

(56) References Cited

U.S. PATENT DOCUMENTS

| | | | |
|---|---|---|---|
| 7,499,455 B2 | 3/2009 | Lee et al. | |
| 8,611,226 B2* | 12/2013 | Li | H04L 12/56 370/238 |
| 2007/0253444 A1* | 11/2007 | Poyhonen | H04L 12/14 370/466 |
| 2009/0248829 A1* | 10/2009 | Habetha | H04W 92/02 709/208 |
| 2014/0146734 A1* | 5/2014 | Katabathuni | H04W 52/0219 370/312 |
| 2014/0146805 A1* | 5/2014 | Lee | H04W 60/00 370/338 |
| 2015/0092748 A1 | 4/2015 | Li et al. | |

OTHER PUBLICATIONS

International Search Report, dated May 28, 2015, in International Application No. PCT/CN2014/085179 (4 pages).

* cited by examiner

CONTROL INFORMATION SENDING METHOD AND APPARATUS

CROSS-REFERENCE TO RELATED APPLICATIONS

This application is a continuation of International Application No. PCT/CN2014/085179, filed on Aug. 26, 2014, the disclosure of which is hereby incorporated by reference in its entirety.

TECHNICAL FIELD

This application relates to the communications field, and in particular, to a control information sending method and apparatus.

BACKGROUND

Currently, control information needs to be transmitted between a communications network of any standard and user equipment to stipulate a protocol, a parameter, or the like in data communication between the two parties.

However, network bandwidth is inevitably occupied by control information transmission, and therefore, a capacity of a data service transmitted over a network is reduced. For example, in a wireless local area network (WLAN), a channel is occupied by massive control information such as a beacon frame. As a result, there is little effective time for data transmission, and a network capacity for transmitting service data over the WLAN is reduced.

SUMMARY

In view of this, embodiments of this application provide a control information sending method and apparatus, so as to resolve a problem of a reduced network capacity of a data service due to control information.

To achieve the foregoing objective, the embodiments of this application provide the following technical solutions:

A first aspect of the embodiments of this application provides a control information sending method, including:

obtaining a control information indication message from a first standard network, where the control information indication message is used to instruct to substitutively send control information of the first standard network, and the control information indication message includes a substitutively sending request message that carries substitutively sent content, or includes the control information to be sent to a client over the first standard network;

selecting a second standard network from one or more other networks that constitute a heterogeneous network with the first standard network; and sending the control information indication message to the second standard network, where the second standard network is used to send the control information to the client according to the control information indication message.

In a first implementation manner of the first aspect of the embodiments of this application, the obtaining a control information indication message from a first standard network includes:

receiving a probe response message sent by an access point of the first standard network, where sending the probe response message is triggered by a probe request message received by the access point of the first standard network, the probe response message carries at least an identifier of the client and a network status parameter of a network in which the access point of the first standard network is located.

In a second implementation manner of the first aspect of the embodiments of this application, the sending the control information indication message to the second standard network includes:

sending multiple probe response messages to an access point of the second standard network when a preset condition is met, where the preset condition includes: the probe response messages sent by a preset quantity of access points of the first standard network are received, or preset sending time arrives.

In a third implementation manner of the first aspect of the embodiments of this application, the obtaining a control information indication message from a first standard network includes:

receiving a network status parameter of a network in which an access point of the first standard network is located, where the network status parameter is periodically sent by the access point of the first standard network; and/or detecting location information of the access point of the first standard network.

In a fourth implementation manner of the first aspect of the embodiments of this application, the sending the control information indication message to the second standard network includes:

sending the control information indication message to an access point of the second standard network in a preset cycle; or sending the control information indication message to an access point of the second standard network after a control information indication message sending request sent by the access point of the second standard network is received.

In a fifth implementation manner of the first aspect of the embodiments of this application, the substitutively sending request message includes:

an information code, sending time at the latest, and a sending cycle; and when the information code is first-time sending, the substitutively sending request message further includes the substitutively sent content.

A second aspect of the embodiments of this application provides a control information sending method, including:

receiving, in a second standard network, a control information indication message, where the control information indication message is used to instruct to substitutively send control information of a first standard network, the control information indication message includes a substitutively sending request message that indicates substitutively sent content of the first standard network, or includes the control information to be sent to a client over the first standard network, and the first standard network and the second standard network constitute a heterogeneous network; and sending the control information to the client over the second standard network according to the control information indication message.

In a first implementation manner of the second aspect of the embodiments of this application, the sending the control information to the client according to the control information indication message includes:

determining an accessible access point list of the first standard network according to an identifier of the client and a network status parameter of a network in which an access point of the first standard network is located, where the identifier and the network status parameter are carried in a probe response message; and determining, according to longest duration for which the client can wait and that is carried in the probe response message, whether time expires, and delivering the accessible access point list to the client if the time does not expire.

In a second implementation manner of the second aspect of the embodiments of this application, the sending the control information to the client according to the control information indication message includes:

determining an accessible access point list from an access point of the first standard network according to a network status parameter of a network in which the access point of the first standard network is located, location information of the access point of the first standard network, and detected location information of the client, where the network status parameter and the location information of the access point of the first standard network are included in the control information indication message obtained from the first standard network; and delivering the accessible access point list to the client.

In a third implementation manner of the second aspect of the embodiments of this application, before the determining an accessible access point list from the access point of the first standard network, the method further includes:

receiving a request that is sent by the client and for switching the client from the second standard network to the first standard network, or detecting a condition for switching the client from the second standard network to the first standard network, where the condition for switching the client from the second standard network to the first standard network includes: a preset user policy about switching the client from the second standard network to the first standard network, or that congestion of the second standard network is greater than a preset upper limit and a priority of the client is lower than a preset level.

In a fourth implementation manner of the second aspect of the embodiments of this application, the sending the control information to the client according to the control information indication message includes:

delivering substitutively sent content corresponding to an information code to a destination client through a control channel or a data channel of the second standard network before sending time at the latest indicated in the substitutively sending request message expires.

A third aspect of the embodiments of this application provides a control information sending method, including:

sending a control information indication message over a first standard network, where the control information indication message includes a substitutively sending request message that indicates substitutively sent content, or includes control information to be sent to a client over the first standard network, the control information indication message is used to instruct a second standard network to substitutively send the control information of the first standard network to the client, and the first standard network and the second standard network constitute a heterogeneous network.

In a first implementation manner of the third aspect of the embodiments of this application, the sending a control information indication message over a first standard network includes:

sending, by an access point of the first standard network, a probe response message, where the probe response message carries at least an identifier of the client and a network status parameter of a network in which the access point of the first standard network is located.

In a second implementation manner of the third aspect of the embodiments of this application, the sending a control information indication message over a first standard network includes:

sending, by an access point of the first standard network in a preset cycle, a network status parameter of a network in which the access point of the first standard network is located, where the network status parameter carries an identifier of the first standard network.

In a third implementation manner of the third aspect of the embodiments of this application, the sending a control information indication message over a first standard network includes:

sending the substitutively sending request message over the first standard network, where the substitutively sending request message carries a destination client identifier.

A fourth aspect of the embodiments of this application provides a control information sending apparatus, including:

an obtaining module, configured to obtain a control information indication message from a first standard network, where the control information indication message is used to instruct to substitutively send control information of the first standard network, and the control information indication message includes a substitutively sending request message that carries substitutively sent content, or includes the control information to be sent to a client over the first standard network;

a selection module, configured to select a second standard network from one or more other networks that constitute a heterogeneous network with the first standard network; and a sending module, configured to send the control information indication message to the second standard network, where the second standard network is used to send the control information to the client according to the control information indication message.

In a first implementation manner of the fourth aspect of the embodiments of this application, that an obtaining module is configured to obtain a control information indication message from a first standard network includes:

the obtaining module is specifically configured to receive a probe response message sent by an access point of the first standard network, where sending the probe response message is triggered by a probe request message received by the access point of the first standard network, the probe response message carries at least an identifier of the client and a network status parameter of a network in which the access point of the first standard network is located.

In a second implementation manner of the fourth aspect of the embodiments of this application, that a sending module is configured to send the control information indication message to the second standard network includes:

the sending module is specifically configured to send multiple probe response messages to an access point of the second standard network when a preset condition is met, where the preset condition includes: the probe response messages sent by a preset quantity of access points of the first standard network are received, or preset sending time arrives.

In a third implementation manner of the fourth aspect of the embodiments of this application, that an obtaining module is configured to obtain a control information indication message from a first standard network includes:

the obtaining module is specifically configured to receive a network status parameter of a network in which an access point of the first standard network is located, where the network status parameter is periodically sent by the access point of the first standard network; and/or detect location information of the access point of the first standard network.

In a fourth implementation manner of the fourth aspect of the embodiments of this application, that a sending module is configured to send the control information indication message to the second standard network includes:

the sending module is specifically configured to send the control information indication message to an access point of the second standard network in a preset cycle, or send the control information indication message to an access point of the second standard network after a control information indication message sending request sent by the access point of the second standard network is received.

In a fifth implementation manner of the fourth aspect of the embodiments of this application, that an obtaining module is configured to obtain a control information indication message from a first standard network includes:

the obtaining module is specifically configured to obtain, from the first standard network, the substitutively sending request message that carries the substitutively sent content, where the substitutively sending request message includes an information code, sending time at the latest, and a sending cycle, and when the information code is first-time sending, the substitutively sending request message further includes the substitutively sent content.

A fifth aspect of the embodiments of this application provides a base station, including:

a receiver, configured to receive a control information indication message, where the control information indication message is used to instruct to substitutively send control information of a first standard network, the control information indication message includes a substitutively sending request message that indicates substitutively sent content of the first standard network, or includes the control information to be sent to a client over the first standard network, and the first standard network and the second standard network constitute a heterogeneous network; and a first transmitter, configured to send the control information to the client according to the control information indication message.

In a first implementation manner of the fifth aspect of the embodiments of this application, the first transmitter includes:

a first determining unit, configured to determine an accessible access point list of the first standard network according to an identifier of the client and a network status parameter of a network in which an access point of the first standard network is located, where the identifier and the network status parameter are carried in a probe response message; and a first sending unit, configured to determine, according to longest duration for which the client can wait and that is carried in the probe response message, whether time expires, and deliver the accessible access point list to the client if the time does not expire.

In a second implementation manner of the fifth aspect of the embodiments of this application, the first transmitter includes:

a second determining unit, configured to determine an accessible access point list from an access point of the first standard network according to a network status parameter of a network in which the access point of the first standard network is located, location information of the access point of the first standard network, and detected location information of the client, where the network status parameter and the location information of the access point of the first standard network are included in the control information indication message obtained from the first standard network; and a second sending unit, configured to deliver the accessible access point list to the client.

In a third implementation manner of the fifth aspect of the embodiments of this application, the base station further includes:

an obtaining unit, configured to: before the second determining unit determines the accessible access point list from the access point of the first standard network, receive a request that is sent by the client and for switching the client from the second standard network to the first standard network, or detect a condition for switching the client from the second standard network to the first standard network, where the condition for switching the client from the second standard network to the first standard network includes: a preset user policy about switching the client from the second standard network to the first standard network, or that congestion of the second standard network is greater than a preset upper limit and a priority of the client is lower than a preset level.

In a fourth implementation manner of the fifth aspect of the embodiments of this application, that a first transmitter is configured to send the control information to the client according to the control information indication message includes:

the first transmitter is specifically configured to deliver substitutively sent content corresponding to the information code to a destination client through a control channel or a data channel of the second standard network before sending time at the latest indicated in the substitutively sending request message expires.

A sixth aspect of the embodiments of this application provides an access point, and the access point is disposed in a first standard network and includes:

a second transmitter, configured to send a control information indication message, where the control information indication message includes a substitutively sending request message that indicates substitutively sent content, or includes control information to be sent to a client over the first standard network, the control information indication message is used to instruct a second standard network to substitutively send the control information of the first standard network to the client, and the first standard network and the second standard network constitute a heterogeneous network.

In a first implementation manner of the sixth aspect of the embodiments of this application, that a second transmitter is configured to send a control information indication message includes:

the second transmitter is specifically configured to send a probe response message, where the probe response message carries at least an identifier of the client and a network status parameter of a network in which the access point of the first standard network is located.

In a second implementation manner of the sixth aspect of the embodiments of this application, that a second transmitter is configured to send a control information indication message includes:

the second transmitter is specifically configured to send, in a preset cycle, a network status parameter of a network in which the access point of the first standard network is located, where the network status parameter carries an identifier of the first standard network.

In a third implementation manner of the sixth aspect of the embodiments of this application, that a second transmitter is configured to send a control information indication message includes:

the second transmitter is specifically configured to send the substitutively sending request message, where the substitutively sending request message carries a destination client identifier.

In the control information sending method and apparatus provided in the embodiments of this application, a control information indication message is obtained from a first standard network, a second standard network is selected from one or more other networks that constitute a heterogeneous network with the first standard network, and the control information indication message is sent to the second standard network, and then to a client over the second standard network. The control information indication message is used to instruct to substitutively send control information of the first standard network. It can be learned that, according to the method and apparatus provided in the embodiments of this application, the control information of the first standard network is substitutively sent over the second standard network, and sending the control information does not need to occupy bandwidth of the first standard network. Therefore, in comparison with the prior art, a network capacity of service data sent over the first standard network can be increased.

BRIEF DESCRIPTION OF DRAWINGS

To describe the technical solutions in the embodiments of this application more clearly, the following briefly introduces the accompanying drawings required for describing the embodiments. Apparently, the accompanying drawings in the following description show some embodiments of this application, and a person of ordinary skill in the art may still derive other drawings from these accompanying drawings without creative efforts.

DESCRIPTION OF EMBODIMENTS

Figure 1:
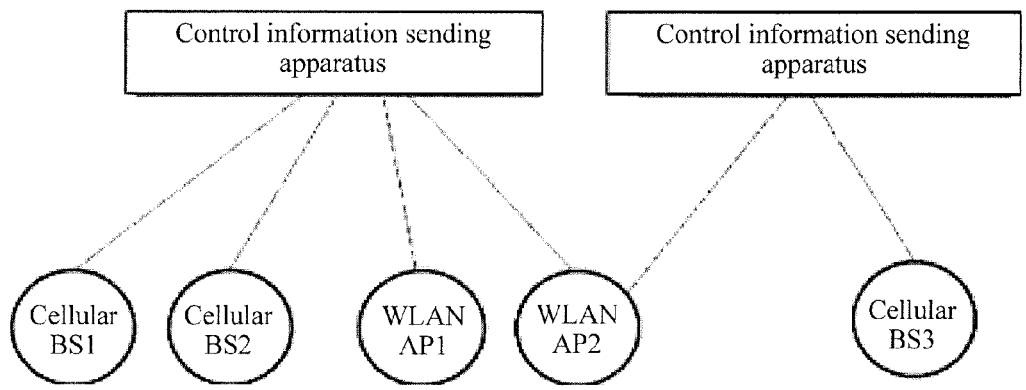
FIG. 1 is a schematic structural diagram of a heterogeneous network.

Embodiments of this application disclose a control information sending method and apparatus that are applied to a heterogeneous network. As shown in FIG. 1, a heterogeneous network includes at least a first standard network (for example, a cellular network) and a second standard network (for example, a WLAN). Specifically, the heterogeneous network includes an access point of the first standard network, for example, a cellular network base station (BS), and an access point of the second standard network, for example, an access point (AP) of the WLAN. In the embodiments of this application, a control information sending apparatus is disposed at an upper layer of the first standard network and the second standard network, and information about networks of different standards is stored in advance in the control information sending apparatus. It should be noted that in the embodiments of this application, "control information" refers to information sent over a network except service data.

Figure 2:
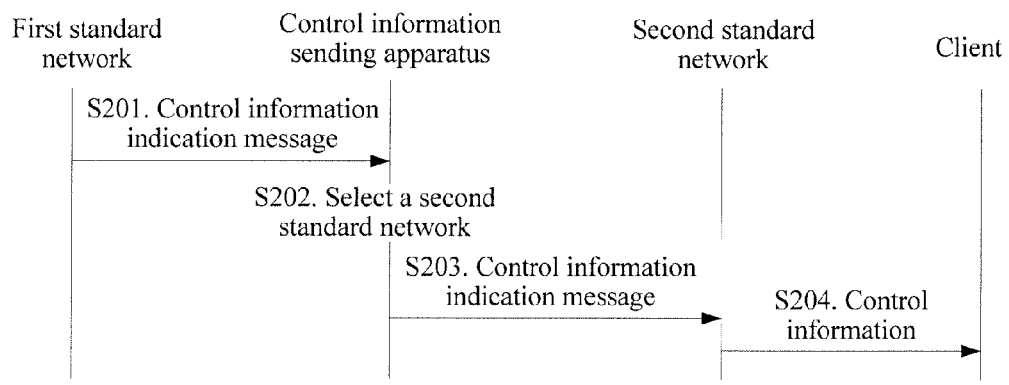
FIG. 2 is a flowchart of a control information sending method disclosed in an embodiment of this application.

As shown in FIG. 2, a control information sending method provided in this application includes the following steps:

S201. A control information indication message is sent to a control information sending apparatus over a first standard network, where the control information indication message is used to instruct to substitutively send control information of the first standard network, and the control information indication message may be a substitutively sending request message that indicates substitutively sent content, or may be the control information to be sent to a client over the first standard network.

S202. The control information sending apparatus selects a second standard network from one or more other networks that constitute a heterogeneous network with the first standard network.

S203. The control information sending apparatus sends the control information indication message to the second standard network.

S204. The control information is sent to the client over the second standard network according to the control information indication message.

After the control information indication message is received in the second standard network, the substitutively sent content or the control information may be sent to the client over the second standard network.

In comparison with the prior art, control information that should be sent to a client over a first standard network is actually sent over a second standard network. Therefore, in the first standard network, bandwidth that is originally used to send the control information can be used to send service data, and a network capacity of service data sent over the first standard network can be increased.

Figure 3:
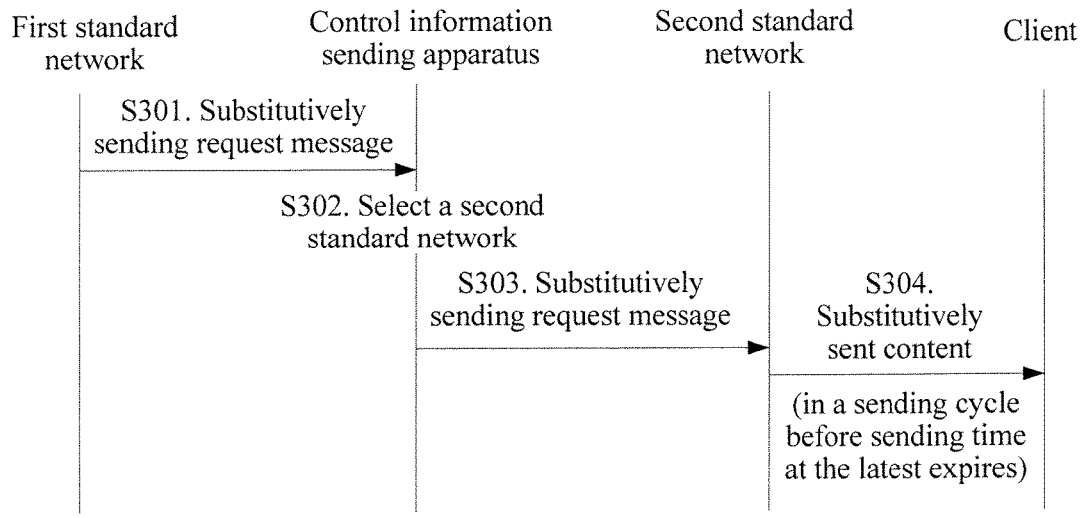
FIG. 3 is a flowchart of another control information sending method disclosed in an embodiment of this application.

FIG. 3 shows another control information sending method disclosed in an embodiment of this application. The method includes the following steps.

S301. An access point of a first standard network sends a substitutively sending request message to a control information sending apparatus.

The substitutively sending request message includes: an information code, sending time at the latest, and a sending cycle. When the information code is first-time sending, the substitutively sending request message further includes the substitutively sent content. It should be noted that, if the substitutively sending request message is not being sent to an access point of a second standard network for the first time, the substitutively sent content may not be sent, and only an information code may be sent. In this embodiment, the substitutively sent content may be a beacon frame.

When a heterogeneous network includes multiple first standard networks, the substitutively sending request message further includes first standard network identifiers to distinguish between the first standard networks.

The substitutively sending request message carries a destination client identifier.

S302. The control information sending apparatus selects a second standard network from one or more other networks that constitute a heterogeneous network with the first standard network.

Because information about all networks is stored in advance in the control information sending apparatus, the control information sending apparatus may select a base station that meets a condition from cellular network base stations. The condition may be a user contract policy, a cooperation policy between operators, or the like. For example, use of another operator network is not allowed in a contract signed by some users, or some operators do not allow network management information to be substitutively sent. These may all be used as corresponding policies.

S303. The control information sending apparatus sends the substitutively sending request message to an access point of the second standard network.

Optionally, after receiving multiple substitutively sending request messages, the control information sending apparatus may send the multiple substitutively sending request messages together to the access point of the second standard network to shorten occupancy duration of a channel, or after preset sending time expires, the control information sending apparatus may send multiple substitutively sending request messages together to the access point of the second standard network. It should be noted that there may be another sending condition except receiving probe response messages sent by a preset quantity of access points of the first standard network and reaching the preset sending time, which is not limited in this embodiment.

S304. Deliver substitutively sent content corresponding to the information code to a destination client through a control channel or a data channel of the second standard network in the sending cycle before sending time at the latest indicated in the substitutively sending request message expires.

If the substitutively sending request message does not include substitutively sent content, the access point of the second standard network may find out the substitutively sent content corresponding to the information code by querying historically sent information.

In this embodiment, control information is no longer directly delivered to a client over a first standard network; instead, a control information sending apparatus selects an access point of a second standard network to deliver the control information to the client, so that bandwidth of the first standard network can be saved. In practical application, the first standard network may be used as a primary network, and the second standard network may be used as a secondary network. To deliver the control information over the secondary network can enable the primary network to focus on service data transmission, so as to improve a primary network service rate and obtain better user experience.

For example, when a WLAN is a primary network, and a cellular network is a secondary network, by using a cellular control channel to assist the WLAN in sending control management information, overheads for sending the control management information may be saved for the WLAN. Currently, in a WLAN network deployed in public, a channel is occupied by control information such as a beacon, resulting in less effective time for data transmission. After using the method in this embodiment, the control management information is sent over the secondary network, so that the channel of the WLAN can be used to transmit more service data information to improve MAC layer efficiency.

The following uses a heterogeneous network that includes a cellular network BS and a WLAN AP as an example to give a detailed description of the control information sending method in the foregoing embodiments.

Figure 4:
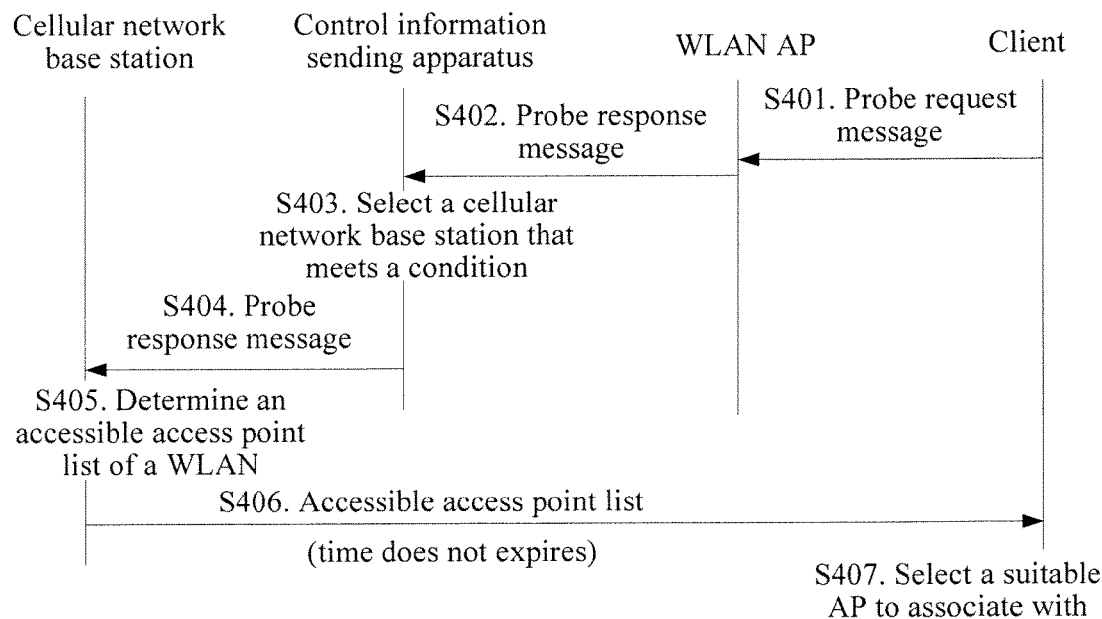
FIG. 4 is a flowchart of another control information sending method disclosed in an embodiment of this application.

An embodiment of this application discloses a control information sending method that is applied to a specific scenario in which a client requests an AP list. As shown in FIG. 4, the method in this embodiment includes the following steps.

S401. The client sends a probe request probe request message to a WLAN.

S402. An AP that receives the probe request message and that is of the WLAN sends a probe response probe response message to a control information sending apparatus, where the probe response message carries at least an identifier of the client and a network status parameter of a network in which the access point of a first standard network is located.

In this embodiment, the network status parameter may include but is not limited to network load, a user quantity, and transmit power.

In this embodiment, optionally, the AP may receive probe request messages sent by a preset quantity of clients and then send the multiple probe response messages together to the control information sending apparatus, so as to save occupancy time of a channel.

S403. The control information sending apparatus selects a cellular network base station that meets a condition.

S404. The control information sending apparatus sends the probe response message to the cellular network base station.

Optionally, multiple probe response messages may be sent to the cellular network base station after the probe response messages sent by a preset quantity of access points of the WLAN are received.

S405. The cellular network base station determines an accessible access point list of the WLAN according to the identifier of the client and the network status parameter of the network in which the AP is located, where the identifier and the network status parameter are carried in the probe response message.

For a list selection policy, refer to the prior art. Details are not described herein.

S406. The cellular network base station determines, according to longest duration for which the client can wait and that is carried in the probe response message, whether time expires, and delivers the accessible access point list to the client if the time does not expire.

Generally, the probe request message carries the longest duration for which the client can wait, and the probe response message also carries the longest duration (the longest duration herein may be initial time and duration, or may be final time only). The base station calculates whether time expires currently, and no accessible access point list is delivered if time expires.

S407. The client receives the accessible AP list sent by the cellular base station and selects a suitable AP to associate with.

In the prior art, when a client requests a accessible AP list from a WLAN, a probe response message is generally sent over the WLAN network to the client. In this embodiment, the probe response message is forwarded by a control information sending apparatus to a cellular network base station and then is sent by the base station to the client. Therefore, bandwidth of the WLAN can be saved, and bandwidth used by a WLAN user for service data can be improved.

Figure 5:
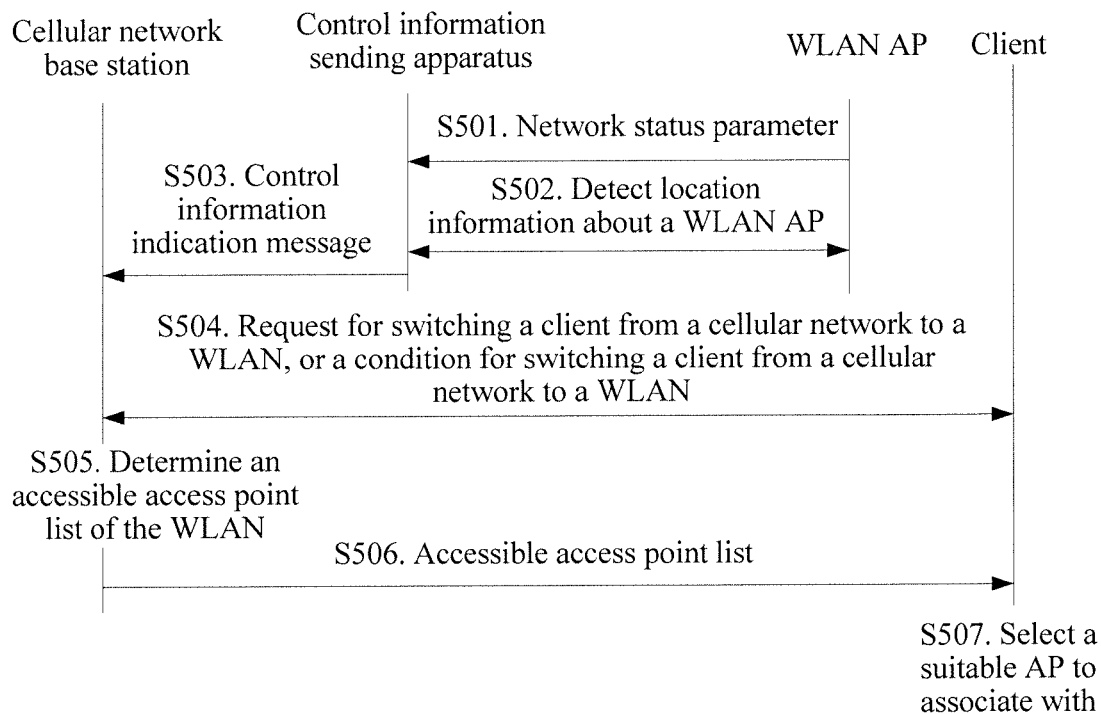
FIG. 5 is a flowchart of another control information sending method disclosed in an embodiment of this application.

An embodiment of this application discloses a control information sending method that is applied to a specific scenario in which a client is switched from a cellular network to a WLAN. As shown in FIG. 5, the method in this embodiment includes the following steps.

S501. A WLAN AP sends a network status parameter of a network in which the AP is located to a control information sending apparatus in a preset cycle, where the network status parameter carries an identifier of a first standard network (e.g. WLAN), and when a heterogeneous network includes multiple first standard networks, the identifier of the first standard network is used to distinguish between the first standard networks.

S502. The control information sending apparatus detects location information of the WLAN AP.

S503. The control information sending apparatus sends a control information indication message to a cellular network base station in a preset cycle, or sends a control information indication message to a cellular network base station after receiving a control information indication message sending request sent by the cellular network base station.

S504. The cellular network base station receives a request sent by the client about switching the client from the cellular network to the WLAN or detects a condition for switching the client from the cellular network to the WLAN.

The condition for switching the client from a second standard network (e.g. cellular network) to the first standard network includes: a preset user policy about switching the client from the second standard network to the first standard network. For example, the more economical first standard network is preferably selected according to a user protocol.

Alternatively, when congestion of the second standard network is greater than a preset upper limit and a priority of the client is lower than a preset level, for example, when congestion of the second standard network is greater than a preset upper limit, a user or an application whose QoS requirement is not high, or a user or an application whose service level is not high is switched to a first standard network.

S505. The cellular network base station determines an accessible access point list from the WLAN AP according to a network status parameter of a network in which the AP is located, location information of the AP, and detected location information of the client, where the network status parameter and the location information of the AP are included in the control information indication message.

S506. Deliver the accessible access point list to the client.

S507. The client selects, according to the accessible access point list, a suitable AP to associate with.

Because the network status parameter carries the identifier of the first standard network, the client may access the AP of the first standard network.

In the prior art, when being switched to a WLAN, a client needs to exchange control information with the WLAN. Therefore, a large amount of bandwidth of the WLAN needs to be occupied. In this embodiment, a cellular network is used to substitutively send the control information of the WLAN to increase a network capacity of the WLAN for sending service data and improve MAC layer efficiency.

Figure 6:
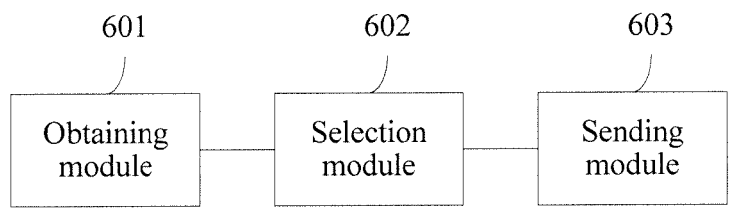
FIG. 6 is a schematic structural diagram of a control information sending apparatus disclosed in an embodiment of this application.

Corresponding to the foregoing method embodiments, an embodiment of this application further discloses a control information sending apparatus. As shown in FIG. 6, the apparatus includes:

an obtaining module 601, configured to obtain a control information indication message from a first standard network, where the control information indication message is used to instruct to substitutively send control information of the first standard network, and the control information indication message includes a substitutively sending request message that carries substitutively sent content, or includes the control information to be sent to a client over the first standard network;

a selection module 602, configured to select a second standard network from one or more other networks that constitute a heterogeneous network with the first standard network; and a sending module 603, configured to send the control information indication message to the second standard network, where the second standard network is used to send the control information to the client according to the control information indication message.

In this embodiment, optionally, the obtaining module may obtain the control information indication message from the first standard network in the following specific implementation manner: receiving a probe response message sent by an access point of the first standard network, where sending the probe response message is triggered by a probe request message received by the access point of the first standard network, and the probe response message carries at least an identifier of the client and a network status parameter of a network in which the access point of the first standard network is located; or receiving a network status parameter of a network in which an access point of the first standard network is located, where the network status parameter is periodically sent by the access point of the first standard network; and/or detecting location information of the access point of the first standard network; or obtaining, from the first standard network, the substitutively sending request message that carries the substitutively sent content, where the substitutively sending request message includes an information code, sending time at the latest, and a sending cycle, and when the information code is first-time sending, the substitutively sending request message further includes the substitutively sent content.

The sending module may be configured to send the control information indication message to the second standard network in the following specific implementation manner: sending multiple probe response messages to an access point of the second standard network when a preset condition is met, where the preset condition includes: the probe response messages sent by a preset quantity of access points of the first standard network are received, or preset sending time arrives; or sending the control information indication message to an access point of the second standard network in a preset cycle; or sending the control information indication message to an access point of the second standard network after a control information indication message sending request sent by the access point of the second standard network is received.

According to the control information sending apparatus described in this embodiment, a control information indication message sent over a first standard network can be obtained, and a second standard network can be selected from a heterogeneous network, so that control information of the first standard network is sent over the second standard network to expand a service capacity of the first standard network and improve MAC layer efficiency.

Figure 7:
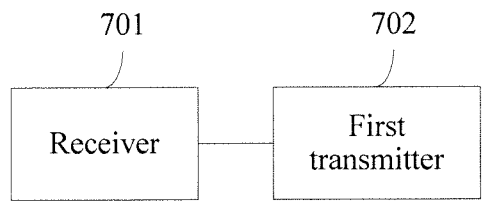
FIG. 7 is a schematic structural diagram of a base station disclosed in an embodiment of this application.

As shown in FIG. 7, an embodiment of this application further discloses a base station, including:

a receiver 701, configured to receive a control information indication message, where the control information indication message is used to instruct to substitutively send control information of a first standard network, the control information indication message includes a substitutively sending request message that indicates substitutively sent content of the first standard network, or includes the control information to be sent to a client over the first standard network, and the first standard network and the second standard network constitute a heterogeneous network; and a first transmitter 703, configured to send the control information to the client according to the control information indication message.

In this embodiment, specifically, the first transmitter may include:

a first determining unit, configured to determine an accessible access point list of the first standard network according to an identifier of the client and a network status parameter of a network in which an access point of the first standard network is located, where the identifier and the network status parameter are carried in a probe response message; and a first sending unit, configured to determine, according to longest duration for which the client can wait and that is carried in the probe response message, whether time expires, and deliver the accessible access point list to the client if the time does not expire.

Alternatively, the first transmitter may include:

a second determining unit, configured to determine an accessible access point list from an access point of the first standard network according to a network status parameter of a network in which the access point of the first standard network is located, location information of the access point of the first standard network, and detected location information of the client, where the network status parameter and the location information of the access point of the first standard network are included in the control information indication message obtained from the first standard network; and a second sending unit, configured to deliver the accessible access point list to the client.

When the first transmitter includes the second determining unit and the second sending unit, optionally, the base station in this embodiment may further include: an obtaining unit, configured to: before the second determining unit determines the accessible access point list from the access point of the first standard network, receive a request that is sent by the client and for switching the client from the second standard network to the first standard network, or detect a condition for switching the client from the second standard network to the first standard network, where the condition for switching the client from the second standard network to the first standard network includes: a preset user policy about switching the client from the second standard network to the first standard network, or that congestion of the second standard network is greater than a preset upper limit and a priority of the client is lower than a preset level.

Optionally, the first transmitter may send the control information to the client according to the control information indication message in the following specific implementation manner: Before sending time at the latest indicated in the substitutively sending request message expires, the first transmitter delivers substitutively sent content corresponding to the information code to a destination client through a control channel or a data channel of the second standard network.

An embodiment of this application further discloses an access point, and the access point is disposed in a first standard network and includes a second transmitter, configured to send a control information indication message, where the control information indication message includes a substitutively sending request message that indicates substitutively sent content, or includes control information to be sent to a client over the first standard network, the control information indication message is used to instruct a second standard network to substitutively send the control information of the first standard network to the client, and the first standard network and the second standard network constitute a heterogeneous network.

Optionally, the second transmitter may send the control information indication message in the following specific implementation manner: sending a probe response message, where the probe response message carries at least an identifier of the client and a network status parameter of a network in which the access point of the first standard network is located; or sending, in a preset cycle, a network status parameter of a network in which the access point of the first standard network is located, where the network status parameter carries an identifier of the first standard network; or sending the substitutively sending request message, where the substitutively sending request message carries a destination client identifier.

When a heterogeneous network includes the base station and the access point that are described in the foregoing embodiments, control information may be exchanged by using a control information sending apparatus. When an access point (or a base station) is used as a primary network, control information of the primary network is sent over a secondary network, so as to enable the primary network to focus on service data transmission to improve MAC efficiency.

If the functions of the method in the embodiment are implemented in the form of a software functional unit and sold or used as an independent product, the functions may be stored in a computing device-readable storage medium. Based on such an understanding, the part of the embodiments of this application contributing to the prior art or some of the technical solutions may be implemented in a form of a software product. The software product is stored in a storage medium, and includes several instructions for instructing a computing device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The embodiments in this specification are all described in a progressive manner, for same or similar parts in the embodiments, reference may be made to these embodiments, and each embodiment focuses on a difference from other embodiments.

The embodiments disclosed above are described to enable a person skilled in the art to implement or use this application. Various modifications made to the embodiments will be obvious to a person skilled in the art, and the general principles defined herein may also be implemented in other embodiments without departing from the spirit or scope of this application. Therefore, this application is not intended to be limited to these embodiments illustrated in this specification, but shall be construed in the widest scope consistent with the principles and novel features disclosed in this specification.

What is claimed is:

1. A method of sending control information comprising:
obtaining a control information indication message from a first standard network, wherein the control information indication message is used to instruct a second standard network to substitutively send control information of the first standard network, and the control information indication message comprises a substitutively sending request message that carries substitutively sent content, or comprises the control information of the first standard network to be sent to a client over the first standard network;

selecting the second standard network from one or more other networks that constitute a heterogeneous network with the first standard network; and sending the control information indication message to the second standard network, wherein the second standard network is used to send the control information of the first standard network to the client according to the control information indication message, wherein the sending the control information indication message to the second standard network comprises:

sending multiple probe response messages to an access point of the second standard network when a preset condition is met, wherein the preset condition comprises: the probe response messages sent by a preset quantity of access points of the first standard network are received, or preset sending time arrives.

2. The method according to claim 1, wherein the obtaining a control information indication message from a first standard network comprises:

receiving a probe response message sent by an access point of the first standard network, wherein sending the probe response message is triggered by a probe request message received by the access point of the first standard network, the probe response message carries at least an identifier of the client and a network status parameter of the first standard network.

3. A method of sending control information comprising:

obtaining a control information indication message from a first standard network, wherein the control information indication message is used to instruct a second standard network to substitutively send control information of the first standard network, and the control information indication message comprises a substitutively sending request message that carries substitutively sent content, or comprises the control information of the first standard network to be sent to a client over the first standard network, wherein the obtaining a control information indication message from a first standard network comprises:

receiving a network status parameter, wherein the network status parameter is periodically sent by an access point of the first standard network; and/or detecting location information of the access point of the first standard network;

selecting the second standard network from one or more other networks that constitute a heterogeneous network with the first standard network; and sending the control information indication message to the second standard network, wherein the second standard network is used to send the control information of the first standard network to the client according to the control information indication message, wherein the sending the control information indication message to the second standard network comprises:

sending the control information indication message to an access point of the second standard network in a preset cycle; or sending the control information indication message to an access point of the second standard network after a control information indication message sending request sent by the access point of the second standard network is received.

4. A method of sending control information comprising:

obtaining a control information indication message from a first standard network, wherein the control information indication message is used to instruct a second standard network to substitutively send control information of the first standard network, and the control information indication message comprises a substitutively sending request message that carries substitutively sent content, or comprises the control information of the first standard network to be sent to a client over the first standard network;

selecting the second standard network from one or more other networks that constitute a heterogeneous network with the first standard network; and sending the control information indication message to the second standard network, wherein the second standard network is used to send the control information of the first standard network to the client according to the control information indication message, wherein the substitutively sending request message comprises:

an information code, sending time at the latest, and a sending cycle; and when the information code is first-time sending, the substitutively sending request message further comprises the substitutively sent content.

5. A control information sending method, comprising:

receiving, in a second standard network, a control information indication message, wherein the control information indication message is used to instruct the second standard network to substitutively send control information of a first standard network, the control information indication message comprises a substitutively sending request message that indicates substitutively sent content of the first standard network, or comprises the control information of the first standard network to be sent to a client over the first standard network, and the first standard network and the second standard network form a heterogeneous network; and sending the control information of the first standard network to the client over the second standard network according to the control information indication message, wherein the substitutively sending request message comprises:

an information code, sending time at the latest, and a sending cycle; and when the information code is first-time sending, the substitutively sending request message further comprises the substitutively sent content.

6. A control information sending method, comprising:

sending a control information indication message over a first standard network, wherein the control information indication message comprises a substitutively sending request message that indicates substitutively sent content, or comprises control information of the first standard network to be sent to a client over the first standard network, the control information indication message is used to instruct a second standard network to substitutively send the control information of the first standard network to the client, and the first standard network and the second standard network form a heterogeneous network, wherein the substitutively sending request message comprises:

an information code, sending time at the latest, and a sending cycle; and when the information code is first-time sending, the substitutively sending request message further comprises the substitutively sent content.

7. A control information sending apparatus, comprising:
a processor; and
a non-transitory computer-readable storage medium coupled to the processor and storing programming instructions for execution by the processor, the programming instructions instructing the processor to:
obtain a control information indication message from a first standard network, wherein the control information indication message is used to instruct a second standard network to substitutively send control information of the first standard network, and the control information indication message comprises a substitutively sending request message that carries substitutively sent content, or comprises the control information of the first standard network to be sent to a client over the first standard network;
select the second standard network from one or more other networks that constitute a heterogeneous network with the first standard network; and
send the control information indication message to the second standard network, wherein the second standard network is used to send the control information of the first standard network to the client according to the control information indication message, wherein the send the control information indication message to the second standard network comprises:
sending multiple probe response messages to an access point of the second standard network when a preset condition is met, wherein the preset condition comprises: the probe response messages sent by a preset quantity of access points of the first standard network are received, or preset sending time arrives.

8. The apparatus according to claim 7, wherein the obtain a control information indication message from a first standard network comprises:
receiving a probe response message sent by an access point of the first standard network, wherein sending the probe response message is triggered by a probe request message received by the access point of the first standard network, the probe response message carries at least an identifier of the client and a network status parameter of the first standard network.

9. A control information sending apparatus, comprising:
a processor; and
a non-transitory computer-readable storage medium coupled to the processor and storing programming instructions for execution by the processor, the programming instructions instructing the processor to:
obtain a control information indication message from a first standard network, wherein the control information indication message is used to instruct a second standard network to substitutively send control information of the first standard network, and the control information indication message comprises a substitutively sending request message that carries substitutively sent content, or comprises the control information of the first standard network to be sent to a client over the first standard network, wherein the obtain a control information indication message from a first standard network comprises:
receiving a network status parameter, wherein the network status parameter is periodically sent by an access point of the first standard network; and/or
detecting location information of the access point of the first standard network;
select the second standard network from one or more other networks that constitute a heterogeneous network with the first standard network; and
send the control information indication message to the second standard network, wherein the second standard network is used to send the control information of the first standard network to the client according to the control information indication message, wherein the send the control information indication message to the second standard network comprises:
sending the control information indication message to an access point of the second standard network in a preset cycle, or
sending the control information indication message to an access point of the second standard network after a control information indication message sending request sent by the access point of the second standard network is received.

10. A control information sending apparatus, comprising:
a processor; and
a non-transitory computer-readable storage medium coupled to the processor and storing programming instructions for execution by the processor, the programming instructions instructing the processor to:
obtain a control information indication message from a first standard network, wherein the control information indication message is used to instruct a second standard network to substitutively send control information of the first standard network, and the control information indication message comprises a substitutively sending request message that carries substitutively sent content, or comprises the control information of the first standard network to be sent to a client over the first standard network;
select the second standard network from one or more other networks that constitute a heterogeneous network with the first standard network; and
send the control information indication message to the second standard network, wherein the second standard network is used to send the control information of the first standard network to the client according to the control information indication message, wherein the obtain a control information indication message from a first standard network comprises:
obtaining, from the first standard network, the substitutively sending request message that carries the substitutively sent content, wherein the substitutively sending request message comprises an information code, sending time at the latest, and a sending cycle, and
when the information code is first-time sending, the substitutively sending request message further comprises the substitutively sent content.

11. A base station, comprising:
a receiver, configured to receive a control information indication message, wherein the control information indication message is used to instruct a second standard network to substitutively send control information of a first standard network, the control information indication message comprises a substitutively sending request message that indicates substitutively sent content of the first standard network, or comprises the control information of the first standard network to be sent to a client over the first standard network, and the first standard network and the second standard network form a heterogeneous network, wherein the substitutively sending request message comprises:

an information code, sending time at the latest, and a sending cycle; and when the information code is first-time sending, the substitutively sending request message further comprises the substitutively sent content; and a first transmitter, configured to send the control information of the first standard network to the client according to the control information indication message.

12. An access point, disposed in a first standard network, comprising:

a second transmitter, configured to send a control information indication message, wherein the control information indication message comprises a substitutively sending request message that indicates substitutively sent content, or comprises control information of the first standard network to be sent to a client over the first standard network, the control information indication message is used to instruct a second standard network to substitutively send the control information of the first standard network to the client, and the first standard network and the second standard network form a heterogeneous network, wherein the substitutively sending request message comprises:

an information code, sending time at the latest, and a sending cycle; and when the information code is first-time sending, the substitutively sending request message further comprises the substitutively sent content.

* * * * *